E. T. COLEMAN.
DIRECTION INDICATOR FOR MOTOR VEHICLES.
APPLICATION FILED OCT. 9, 1915.

1,234,448. Patented July 24, 1917.

Inventor
E. T. Coleman

Witnesses

By
Attorney

UNITED STATES PATENT OFFICE.

EMMETT T. COLEMAN, OF FAIRVIEW, OREGON.

DIRECTION-INDICATOR FOR MOTOR-VEHICLES.

1,234,448.　　　　Specification of Letters Patent.　　Patented July 24, 1917.

Application filed October 9, 1915. Serial No. 55,035.

*To all whom it may concern:*

Be it known that I, EMMETT T. COLEMAN, a citizen of the United States, residing at Fairview, in the county of Multnomah and State of Oregon, have invented certain new and useful Improvements in Direction-Indicators for Motor-Vehicles; and I do hereby declare the following to be a full, clear, and exact description of the invention, such as will enable others skilled in the art to which it appertains to make and use the same.

This invention relates to new and useful improvements in direction indicators for motor vehicles and the principal object of the invention is to provide a device to indicate to persons at street corners of the intention of the driver of a motor vehicle when making a turn.

Another object of the invention is to provide a device which is applicable to all kinds of motor vehicles.

A further object of the invention is to provide an indicator capable of indicating to other vehicles as well as the public in general the direction to be taken.

A further and more specific object of the invention is to provide a device which after having been operated will return to its normal position.

With these and other objects in view, the invention consists in the novel combination and arrangement of parts which will be fully set forth in the following specification and accompanying drawings, in which:—

Figure 1:
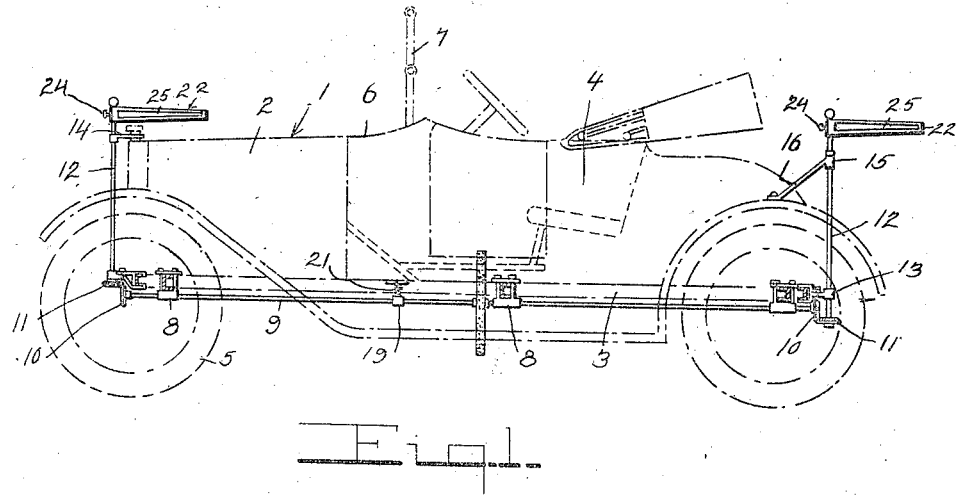
Figure 1 is a side view in elevation of a motor vehicle, showing this improved indicator attached thereto.
Figure 2:
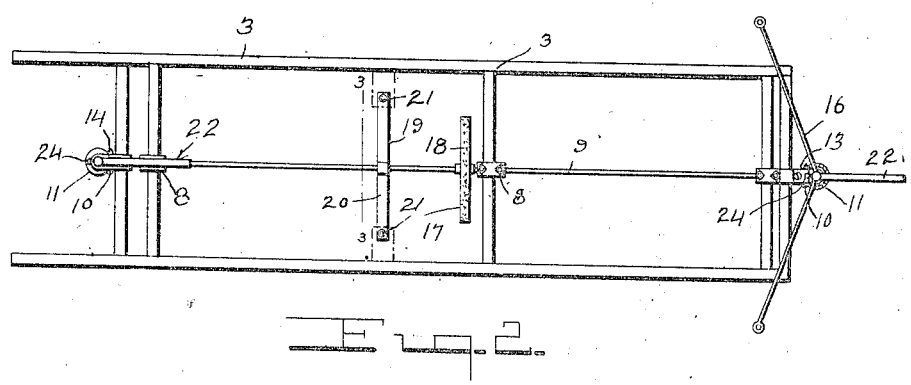
Fig. 2 is a top plan view of the chassis of the vehicle showing the indicator applied thereto.
Figure 4:
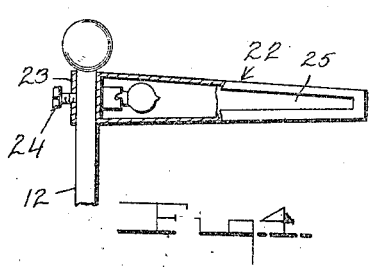
Fig. 4 is an enlarged detail view partly in section of the indicator.
Figure 3:
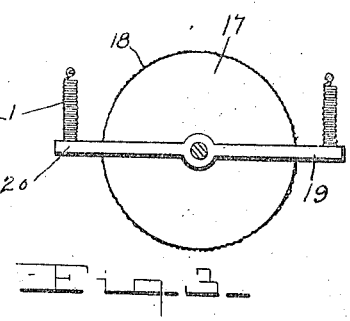
Fig. 3 is an enlarged detail sectional view on line 3—3 of Fig. 2.

Referring now to the drawings by characters of reference, the numeral 1 designates as an entirety a motor vehicle of the usual construction comprising the ordinary hood 2, chassis 3, body 4 and wheels 5. The body is provided with the ordinary dash or cowl 6 carrying the ordinary wind shield 7.

Extending longitudinally of the vehicle and supported in suitable bearing brackets 8 is the main shaft 9 provided at opposite ends with the bevel gears 10. These gears 10 mesh with the bevel gears 11 mounted on the lower ends of the vertical drive shafts 12 on which the indicating arms are mounted and these shafts 12 are mounted at their lower ends in suitable brackets 13 which are secured to the end bars of the chassis, while the upper end of the forward shaft is journaled in a suitable bracket 14 secured to the radiator cap of the vehicle, while the upper end of the rear shaft is journaled in the bracket 15 having formed thereon the arms 16 which are secured to the body or fenders of the vehicle as clearly shown in Fig. 1.

In order to rotate the main shaft 1, there is provided the large wheel 17 which is keyed or otherwise secured thereto and the periphery of this wheel is provided with a plurality of serrations 18 forming a substantially milled surface and this wheel extends up through the floor of the car as illustrated in Fig. 1 so as to be easily engaged by the foot of the operator. In order to normally hold the shaft against accidental turning there is provided the rocker arm 19 which is keyed to said shaft at a point forward of the wheel 17 and secured to the ends of this rocker arm as at 20 are the springs 21, the upper ends of which are secured to the chassis and it will be apparent that as the wheel is turned in either direction either one of the springs will be under tension. It will thus be seen that the springs will act against each other to hold the shaft normally stationary so that the indicators will be held in non-indicating position.

The indicating arms or pennants consist of a hollow rectangular box designated generally by the numeral 22 and is preferably oblong in shape tapering toward its free end. The casing 22 has secured to its enlarged end, the sleeve 23 provided with a set screw 24 by means of which the device is securely held in place on the shaft on which it is mounted. The side walls 25 are formed of a translucent or transparent material, preferably of red glass or the like so that a light positioned with the device will be seen through the wall 25, thereby enabling the signal to be given after night.

It will be apparent from the foregoing that in use upon rotation of the wheel 17 the signals at the opposite end of the car will be thrown to either of their indicating positions, thereby informing persons approaching the vehicle of the driver's intention.

While in the foregoing there has been shown and described the preferred embodiment of this invention, it is to be understood that such changes may be made in the combination and arrangement of parts as will fall within the spirit and scope of the appended claim.

What is claimed is:

In combination with an automobile, including a chassis and a body having a slot in the flooring thereof, of a longitudinally extending shaft journaled to the chassis and underlying the body, vertically extending shafts journaled to the front and rear ends of the body, means for rotatably connecting the vertical shaft to the horizontal shaft, direction indicating elements carried by the vertical shaft, a wheel keyed to the longitudinal shaft and having its upper periphery projecting through the slot of the body, said wheel having its periphery serrated to permit the operator's foot to engage and grip the upper periphery of the wheel to turn the shafts, a bar secured to the shaft adjacent the wheel and extending transversely of the body and underlying the same, springs connected to the ends of the bar and to the chassis for normally holding the direction indicating member against accidental movement and for returning the direction indicating member to non-signaling position.

In testimony whereof I affix my signature in presence of two witnesses.

EMMETT T. COLEMAN.

Witnesses:
J. A. EASTMAN,
J. ALLEN HARRISON.